United States Patent [19]

Borcoman

[11] 4,421,710

[45] Dec. 20, 1983

[54] METHOD, DEVICES, MOLD BEARING STRUCTURES AND INSTALLATIONS FOR IMPROVING THE EFFICIENCY OF PROCESSES FOR THE MANUFACTURE OF PRESTRESSED CONCRETE PRODUCTS

[76] Inventor: Mircéa Borcoman, 11, rue du Général Henrion Bertier, 92200 Neuilly sur Seine, France

[21] Appl. No.: 342,090

[22] Filed: Jan. 25, 1982

[30] Foreign Application Priority Data

Feb. 4, 1981 [FR] France ............................ 81 02087

[51] Int. Cl.³ ........................ B28B 23/04; B23K 1/20

[52] U.S. Cl. .................................. 264/228; 249/86; 264/297; 425/111

[58] Field of Search ............... 264/228, 297; 425/111; 249/86

[56] References Cited

U.S. PATENT DOCUMENTS

| | | | |
|---|---|---|---|
| 3,726,461 | 4/1973 | Fukushima et al. | 264/228 X |
| 3,732,044 | 5/1973 | Borcoman | 425/111 |
| 3,903,222 | 9/1975 | Brown | 264/228 X |
| 4,038,355 | 7/1977 | Bratchell | 264/228 X |
| 4,051,216 | 9/1977 | Bratchell | 264/228 X |
| 4,061,454 | 12/1977 | Borcoman | 425/88 |
| 4,242,071 | 12/1980 | Stinton | 264/228 X |
| 4,269,577 | 5/1981 | Borcoman | 425/62 |
| 4,290,740 | 9/1981 | Borcoman | 425/88 X |

FOREIGN PATENT DOCUMENTS

| | | |
|---|---|---|
| 2166556 | of 0000 | France . |
| 1181226 | 6/1967 | United Kingdom . |
| 1377189 | 3/1971 | United Kingdom . |
| 1391718 | 10/1972 | United Kingdom . |

*Primary Examiner*—Philip E. Anderson
*Attorney, Agent, or Firm*—Larson and Taylor

[57] ABSTRACT

Some self-supporting screens for closing the mold head, some self-supporting separating screens, group positioning devices and group tensioning devices, are used. A series of novel installations for the shock heat treatment, stripping and removal of the products enables by combination with the foregoing means, improvement with respect to known processes, on the one hand of the manufacturing process and on the other hand enables stripping to be brought forward.

22 Claims, 29 Drawing Figures

METHOD, DEVICES, MOLD BEARING STRUCTURES AND INSTALLATIONS FOR IMPROVING THE EFFICIENCY OF PROCESSES FOR THE MANUFACTURE OF PRESTRESSED CONCRETE PRODUCTS

The invention relates to a method, to devices, to mold-bearing structures and to installations enabling the efficiency of processes for the manufacture of products of concrete prestressed by bonded reinforcements to be improved.

It is known that the manufacture of prestressed concrete often involves the casting and hardening of concrete in molds and special requirements for the operations of positioning, stressing and loosening (relaxation) of the reinforcements (wires or strands).

Through this fact, the efficiency of any method for the manufacture of prestressed concrete elements is determined principally by the utilization cycle of the mold and by means used for the positioning, the tensioning and the loosening of the reinforcements.

In so-called "ground-bed" processes, the molds are used once only daily, which renders inefficient the industrial exploitation of these processes.

"Production line" processes manage to use the molds up to twice daily but, due to the fact that said molds have the width of the product to be manufactured, the operations of positioning, tensioning and loosening of the reinforcements are laborious, particularly for short products.

The "float production line process", which has certain facilities for the hardening of concrete, has not hitherto been provided with means for the manufacture of prestressed concrete elements.

The "rotary hall" and "rotary drum" processes have still unexploited reserves both for the rapid rotation of the molds and for the various technological processes.

It is an object of the invention to place at the disposal of these processes, a method, devices, mold-bearing structures and installations enabling their efficiency to be improved.

According to the invention, the method of improving the efficiency of the manufacturing processes mentioned above, uses some mobile and self-supporting screens, some positioning and group-tensioning devices, novel mold-bearing structures and some installations for hardening the concrete and for stripping (demolding or release from the molds) which on the one hand simplifies the respective technological processes and assures an non-negligable reduction in reinforcement losses (wires or strands) and which on the other hand enables, in certain cases, the stripping to preceed by transferring through said screen the prestressing force at the end of the elements and the hardening of the stripped elements to continue for the further period after which, the concrete having an increased strength, the transfer of the prestressing by bonding between reinforcements and concrete becomes more efficient.

According to the invention, the devices, the bearing structures and the installations, enabling the efficiency of the various manufacturing processes of prestressed concrete products to be improved, consist principally of:

- head (or end) screens, movable with respect to the molds and self-supporting with respect to the tensioning and prestressing forces;
- separating screens, movable and self-supporting;
- devices for group positioning the reinforcements;
- devices for the group tensioning of the reinforcements, by inclined (or skew) sliding with respect to the molds;
- devices for group tensioning by a deformable parallelogram;
- devices for group tensioning by parallel slippage;
- devices for group tensioning by tilting;
- fixed or movable mold bank, self-supporting with respect to the tensioning forces, provided with self-supporting movable screens and, in certain cases, with devices for group tensioning;
- mold-bearing structures equipped with one or several means described above;
- shock heat treatment installations provided with covers particularly metallic and with intensive heating chambers;
- installations for transfer of the covers by gravity;
- multipurpose stripping installations: transfer of covers, stack stripping, transfer of stripped products and, in certain cases, cleaning and oiling;
- cooling installations for the stripped products.

Preferably, the head screens for the group tensioning of the reinforcements, movable with respect to the molds, include on the one hand either two walls according to the profile of the product to be manufactured, reinforced by means of ribs in order to render them self-supporting with respect to the tensioning forces and with respect to the prestressing forces, namely a single self-supporting part with respect to the said forces and on the other hand some means for anchoring the reinforcements and means enabling their rapid engagement on the various group tensioning devices so that, provided with holes for the passage of reinforcements, said screens facilitate the operations of positioning, tensioning and stripping, ensure the reduction of losses of reinforcements and take up the prestressing forces in the required time, after stripping.

In the case of tensioning wire by wire of the reinforcements, the head screens are constituted by a framework self-supporting with respect to the tensioning and prestressing forces, which framework is provided on the one hand with means for anchoring the reinforcements and with a wall according to the product to be manufactured and on the other hand with sloped slippage means with respect to the ends of the molds and locking means with respect to the latter so that on the one hand said screens enable the operation of stripping to be automatized and so that on the other hand they facilitate the positioning, reduce the losses of reinforcements and take up the prestressing forces after stripping.

The movable and self-supporting separating screens are constituted in the same manner as the end or head screens, not being provided with engagement and sliding means, but in certain cases with means for temporary locking inside the molds.

Preferably, the group positioning devices for the reinforcements include several arms, with a tilting top, of which one is fixed and the other or others movable along the mold so that, in the "arms closed" position (at one of the two ends of the molds), the screens, self-supporting or not, are fixed on said heads, and the reinforcements are threaded through said screens and so that, in the "arms separated" position, the "screens-reinforcements" assembly is tilted into the molds.

Advantageously, the devices for group tensioning by biassed sliding with respect to the molds include some spindles sliding within sleeves, the latter being fixed skew at the ends of the structure for taking up the tensioning force, which spindles are provided with means for engaging the head screens and sliding means, so that, by bringing them closer with respect to the molds, they ensure the slow relaxation of the reinforcements, facilitating the release from the molds in stacks and freeing the head screens which remain flat on the ends of the stripped products.

Preferably the devices for group tensioning by a deformable parallelogram include on the one hand a series of rods or brackets provided with means for engaging the head screens, connected by ordinary hinges to a series of fastening rods by hinges at the ends of the structure for taking up the tensioning forces, and on the other hand with locking means so that the whole unit described operates like a deformable parallelogram which, in tensioned position, is self-locking and which, by unlocking, ensures the slow relaxation of the reinforcements, facilitates stripping and frees the top screens which emerge thus flattened at the ends of the stripped products.

Preferably, the devices for group tensioning by sliding in parallel with respect to the molds include on the one hand some arms provided with means for fastening to the two ends of the structure for taking up the tensioning force, and on the other hand some sliding beams provided with means for engaging the head screens and with rods for tensioning.

Advantageously, the devices for group tensioning by tilting include on the one hand some arms provided with tilting means, mounted at the two ends of the structure for taking up the tensioning force, and on the other hand some strengthening beams provided with means for fastening to the tilting arms, with engagement means for the head screens and with locking means for said screens. In certain cases, when the relaxation of the reinforcements is called upon to assist the emergence of the products from the molds, said tilting arms are mounted on the tops of the supporting structure through inclined sliding apparatuses.

Preferably, the beds of self-supporting molds include a metallic framework lined with shells, capable of taking up the tensioning forces, equipped with movable and self-supporting screens and, in certain cases with group tensioning devices, which framework can be provided with roller means.

The movable and self-supporting screens, the positioning and group tensioning devices and the beds of the self-supporting molds previously described, enable improvement on the one hand of the mold-bearing structures and on the other hand the installations for hardening the concrete and stripping of the various processes.

Thus, the self-supporting beds of molds of a certain length can be fixed to the ground, or in particular moved in mass production circuits of the ordinary type or of the type using rotation.

For the "float chain" process, it is possible to produce floating structures self-supporting with respect to the tensioning forces, provided with group tensioning devices and equipped either with a smooth platform, or with batteries of molds provided with movable and self-supporting screens.

For the "rotary hall" and "rotary drum" processes, processes using rotation on a horizontal axis, the method and the various devices enabling the construction of novel supporting structures which pass the beds of self-supporting molds or the batteries of ordinary molds through a shock heat treatment installation and present them opposite a multipurpose stripping installation, so that the products stripped in stacks, provided in certain cases with self-supporting screens, are transferred through a cooling chamber onto a removable chain where the self-supporting screens can be recovered.

The invention consists, apart from the features discussed above, of certain other features which will be more explicitly considered below, with regard to several preferred embodiments described with reference to the accompanying drawings, but which are in no way limiting.

FIG. 1 of these drawings is a perspective view of the movable and self-supporting screens, designed for the group tensioning of reinforcements and to enable the cutting of the latter after stripping.

The method according to the invention, uses some movable and self-supporting screens Et, for closing the molds m at both ends and anchoring the reinforcements a (wires or strands), some movable and self-supporting separating screens Es, group positioning devices MP, group tensioning devices MT, by means of which it is possible either to form self-supporting beds of molds Ba, or to equip directly certain structures supporting molds so as to improve on the one hand the technological processes of positioning, tensioning and relaxation with at the same time reduction in the losses of reinforcements and so as to produce on the other hand novel mold-supporting structures equipped with self-supporting beds of molds or with ordinary batteries of molds bm, which structures pass the molds through a shock heat treatment installation using covers C(FIG. 8), particularly metalic, for the closing of the molds and a fixed chamber F, along the path of the molds, provided with intensive heating means, at the end of which a multipurpose installation D, disengages and transfers said covers, effects in a second stage the stripping of the products p, in stacks, with slow transfer of the prestressing forces to the head screens and carries out in a third stage the positioning of the stripped products, provided with said screens, in front of a cooling installation R, so that, after the passage of said products through this latter installation, they arrive at a removal chain where the self-supporting screens are recovered and thus the transfer of the prestressing forces to the concrete by bonding, the latter having acquired an additional strength relative to that existing at the time of stripping.

The head screens Et1, (FIGS. 1, 6, 7, 15, 16, 20 and 27), designed for the group-tensioning of the reinforcements and to permit the cutting of the latter after stripping, include on the one hand two front walls 1, along the profile of the product to be manufactured and mounted with respect to one another at a distance enabling said cutting, which walls are provided with holes for the passage of said reinforcements and covers 2, (dismountable or fixed and provided with holes t for cutting reinforcements), and reinforced by means of vertical 3*a*, or/and horizontal 3*b*, ribs in order to render them self-supporting both with respect to the tensioning forces and with respect to the prestressing forces, and include on the other hand means 4 for anchoring the reinforcements and means 5 for rapid engagement on various group tensioning devices, so that said screens, movable with respect to the molds, facilitate the operations of positioning, tensioning and stripping, reduce the losses of reinforcements and can take up the prestressing forces in the requisite time after stripping.

Figure 1:
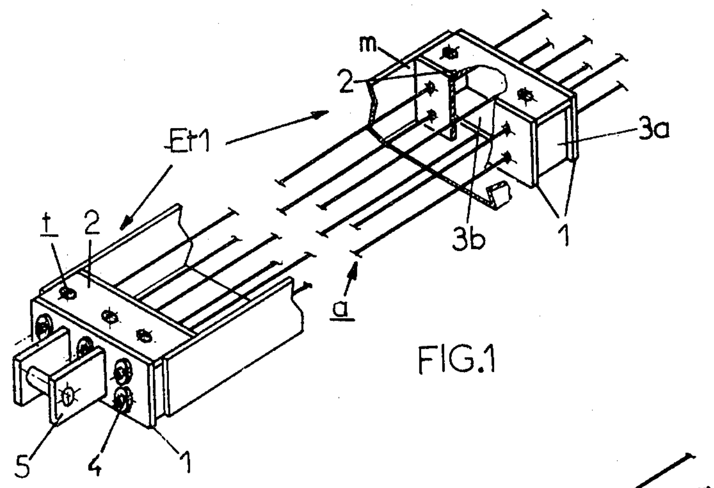
Figure 2:
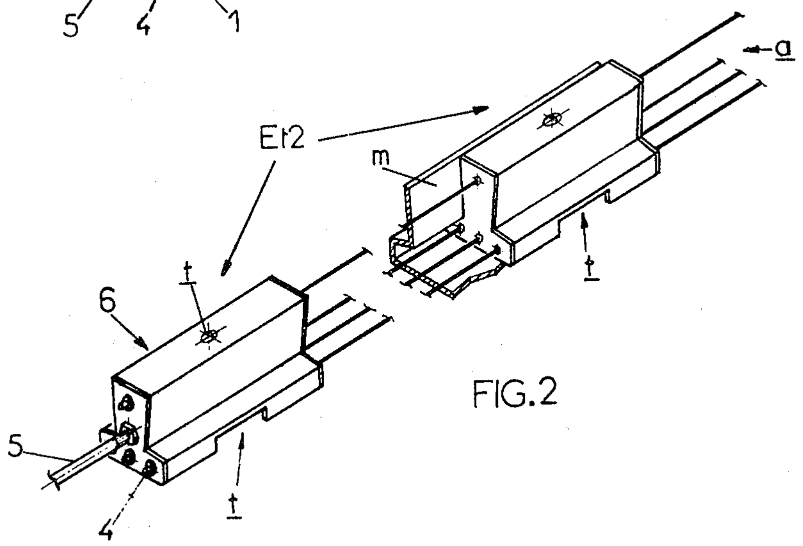
FIG. 2 is a perspective view of the movable and self-supporting screens, designed in one piece for the group tensioning of the reinforcements with or without the final cutting of the latter.
Figure 3:
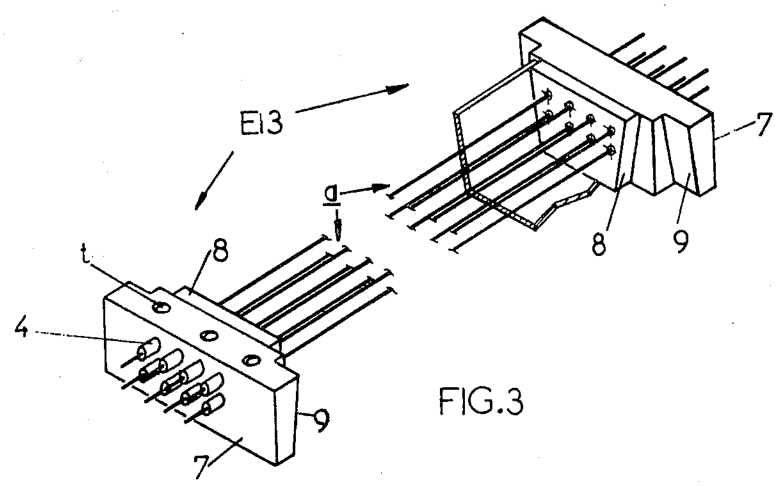
FIG. 3 is a perspective view of two movable and self-supporting head screens, designed for the tensioning of the reinforcements wire by wire.
Figure 4:
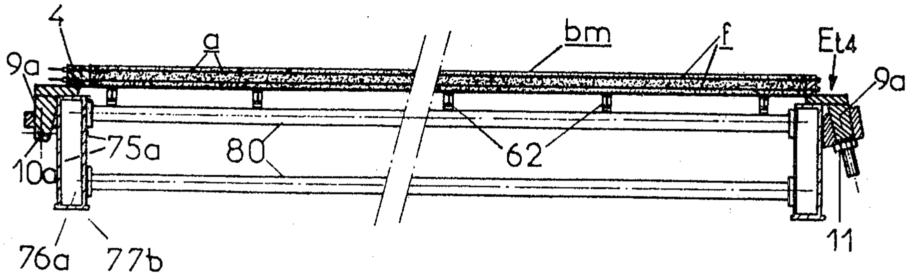
FIG. 4 is a longitudinal section of a self-supporting structure provided with movable and self-supporting head screens, designed so as to serve on the one hand for tensioning wire by wire and so as to carry out, in certain cases group tensioning by rows of molds.
Figure 5:
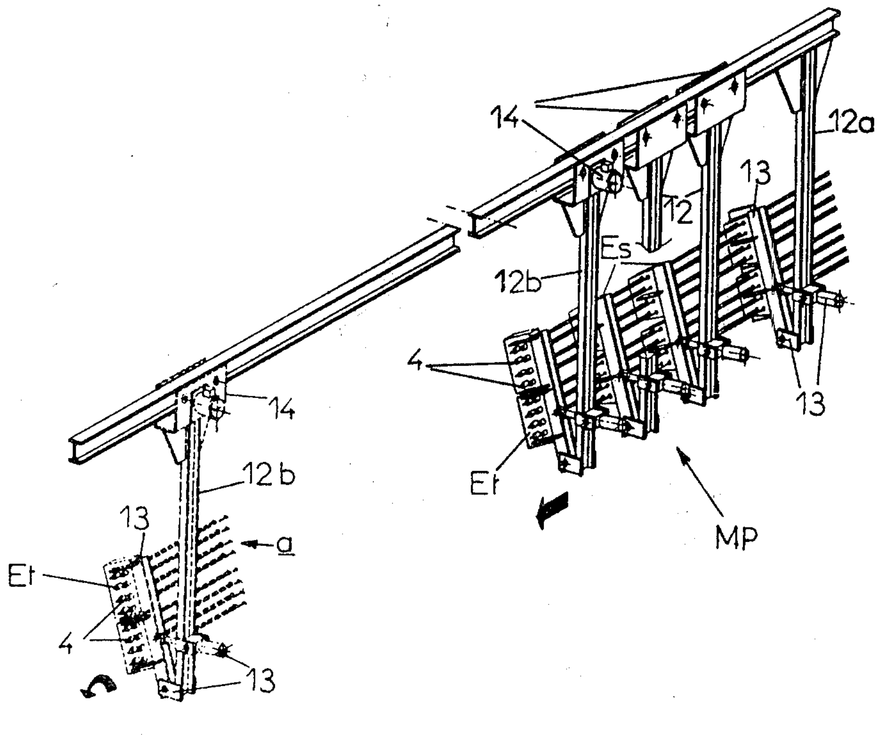
FIG. 5 is a perspective view of a device for the group positioning of the reinforcements by means of said self-supporting screens.
Figures 6, 7:
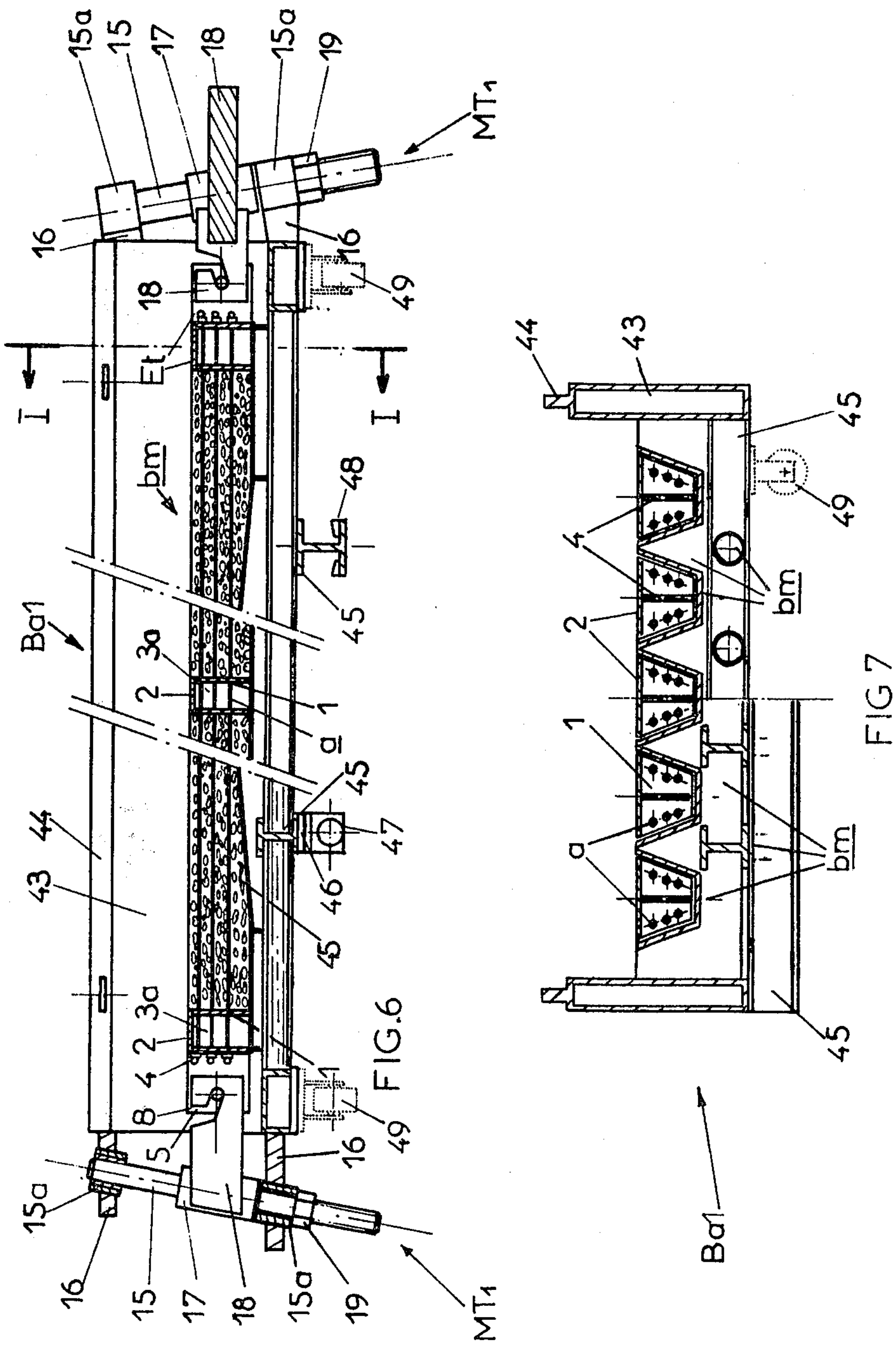
FIG. 6 is a longitudinal section through a bed of self-supporting molds, provided on the one hand with self-supporting screens and with group tensioning devices by sliding skew and on the other hand, in certain cases with its own roller means.
FIG. 7 is a cross-section along the line I—I of FIG. 6 through said self-supporting bed.

The head screens Et2, (FIG. 2), also designed for the group tensioning, are constituted in a single part 6, particularly cast according to the profile of the product to be manufactured, which part is endowed with means 4, for anchoring and means 5, for engagement and provided in certain cases with holes and/or cavities t for cutting the reinforcements when this operation is necessary, so that said screens movable with respect to the molds, ensure the same functional advantages as the screens Et1.

Figure 17:
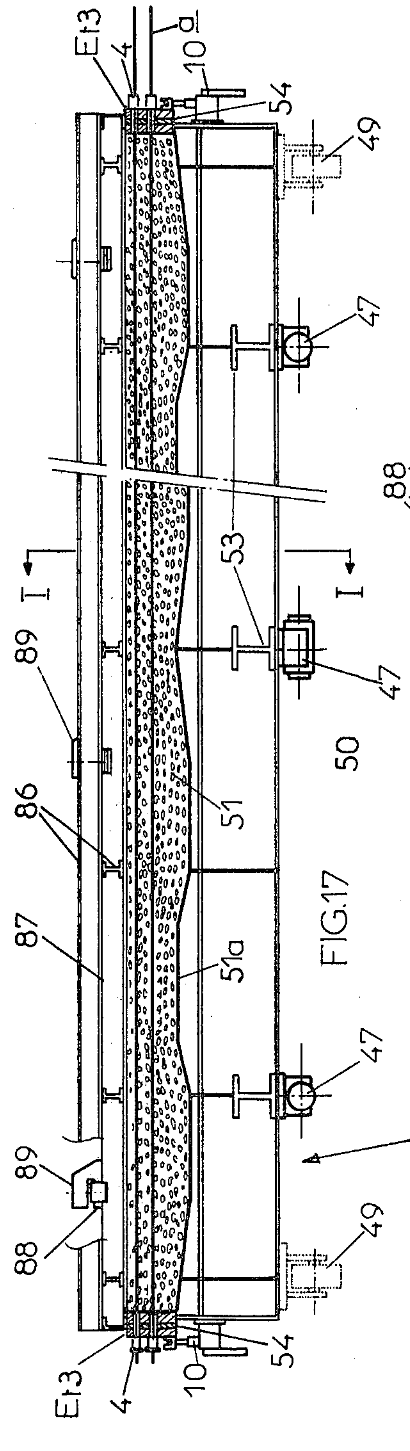
FIG. 17 is a longitudinal section through a self-supporting beds of molds, provided with self-supporting screens for the tensioning wire by wire of the reinforcements, which bed is equipped with a metal cover enclosing the concrete in the molds.
Figure 18:
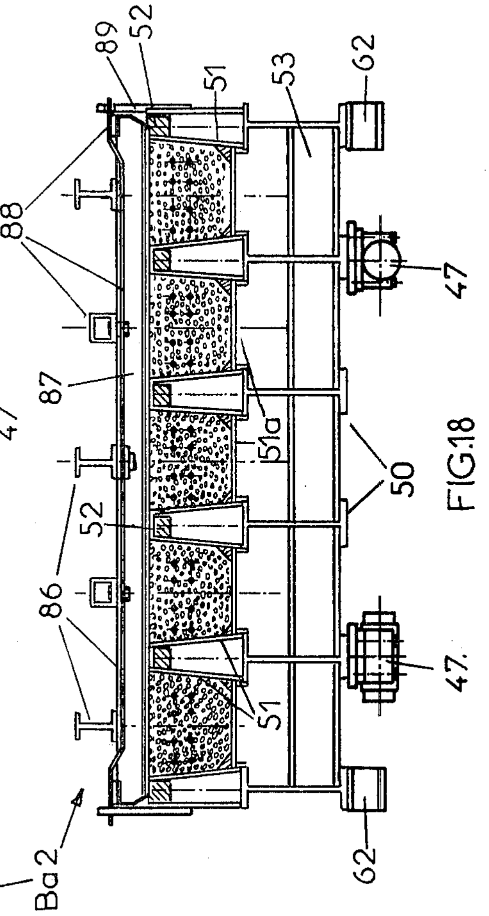
FIG. 18 is a cross-section along the line I—I of FIG. 17 through said self-supporting bed.

The head screens Et3, (FIGS. 3, 5, 17, and 26), designed for the wire by wire tensioning of the reinforcements, include a strengthening plate 7, self-supporting both with respect to the tensioning forces and with respect to the prestressing forces, which plate is provided on the one hand with means 4, for anchoring the reinforcements and with a wall 8, along the profile of the product to be manufactured, which wall extends inside the molds over a length ensuring rapid and fluid-tight fastening and, in certain cases, the cutting of the reinforcements through holes and/or cavities t, and provided on the other hand with means 9, for sliding on a slope with respect to the ends of the molds and means 10 (FIG. 17), for locking with respect to the latter, so that on the one hand said screens, movable with respect to the molds, enable, as a function of the slope given to the slide means, the stripping to be carried out simply by unlocking means 10, and so that on the other hand said screens facilitate the positioning, ensure reduction in losses of reinforcements, and can take up the prestressing forces, in the desired time after stripping.

The head screens Et4, (FIGS. 4, 9, 15, and 23), include on the one hand the same type of framework for anchoring the reinforcements as the screens Et1, but they are provided with some feet *9a*, for sliding on a slope, welded intimately to said framework so that, by equipping said feet with locking devices *10a*, said screens serve for the wire by wire tensioning of the reinforcements, ensure automatic stripping and so that by equipping said parts with traction means 11, especially by screwing, the screens Et4, can ensure on the one hand the group tensioning of the bolted wires f and on the other hand automatic stripping.

The movable and self-supporting separating screens Es, (FIGS. 1, 2, 5, 15 and 20) provided in certain cases with temporary fastening means with respect to the molds, are constituted in the same way as the head screens without obviously being provided with anchoring and engagement means.

Figure 19:
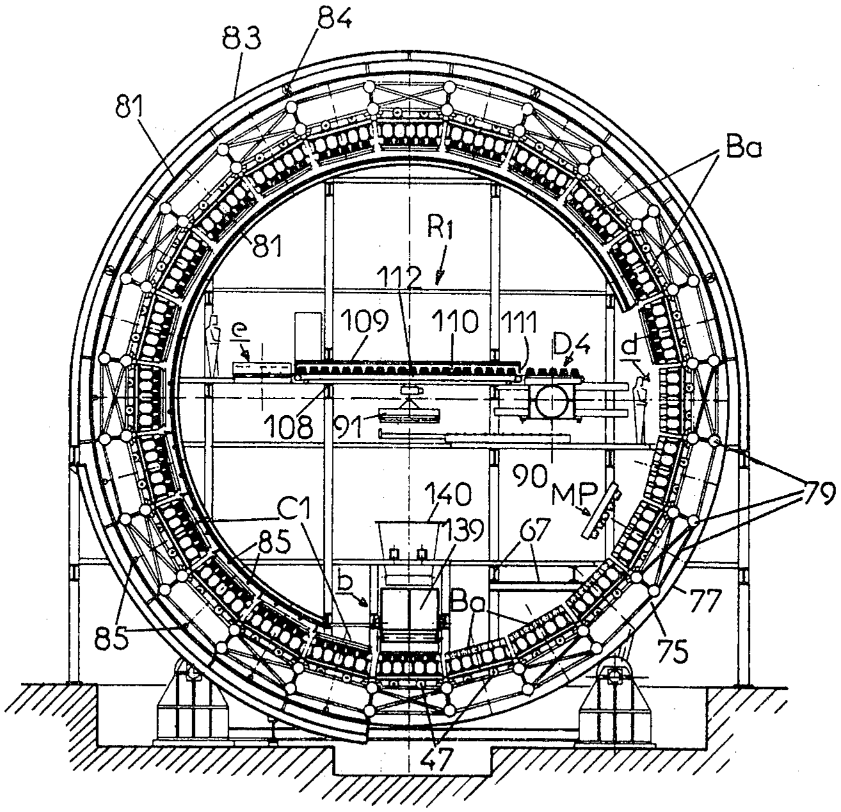
FIG. 19 is a cross-section of a "rotary hall" provided on the one hand with a rotary structure equipped with self-supporting beds of molds (FIGS. 17 and 18), and provided on the other hand with a group positioning device for a steam shock heat treatment installation, with a multipurpose stripping installation and with a cooling installation arranged on the horizontal.
Figure 20:
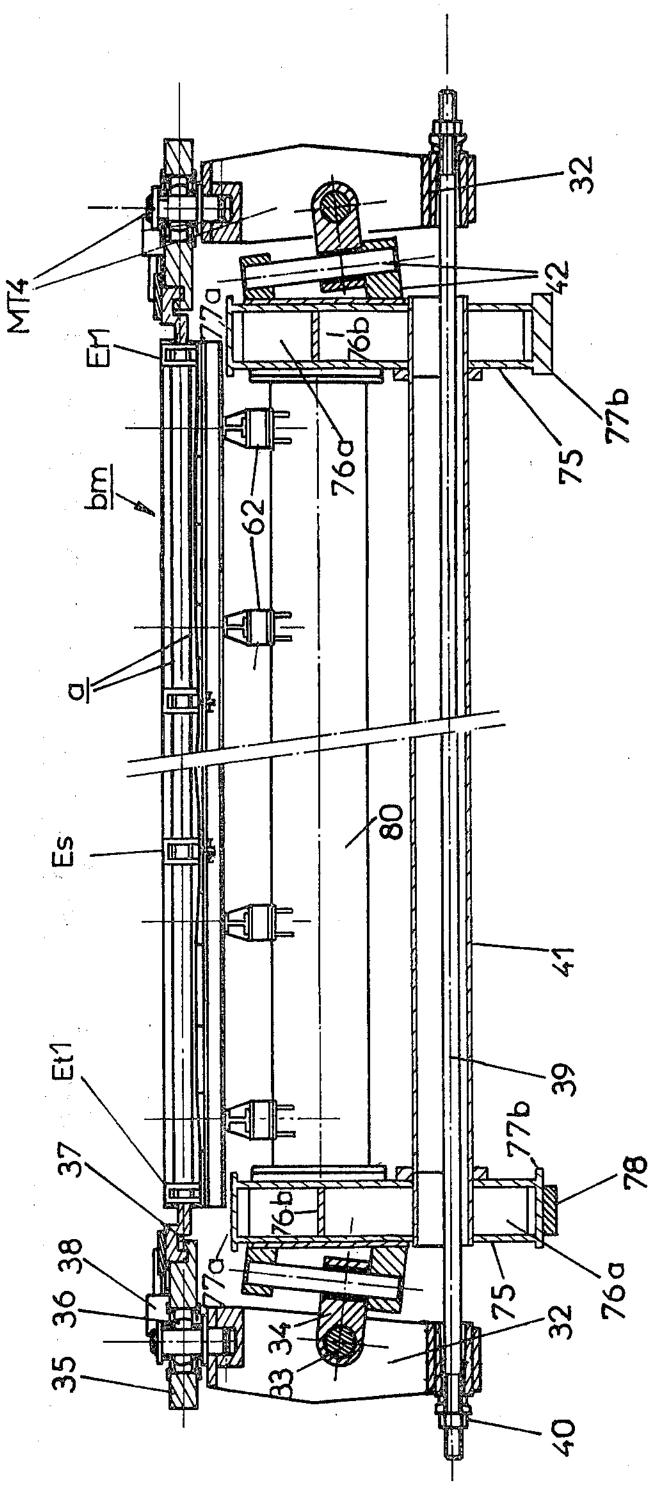
FIG. 20 is a longitudinal section through a rotary structure of the "rotary hall" type, self-supporting with respect to the tensioning forces, which structure is provided with group tensioning devices by tilting and equipped with batteries of ordinary molds provided with self-supporting screens.
Figure 21:
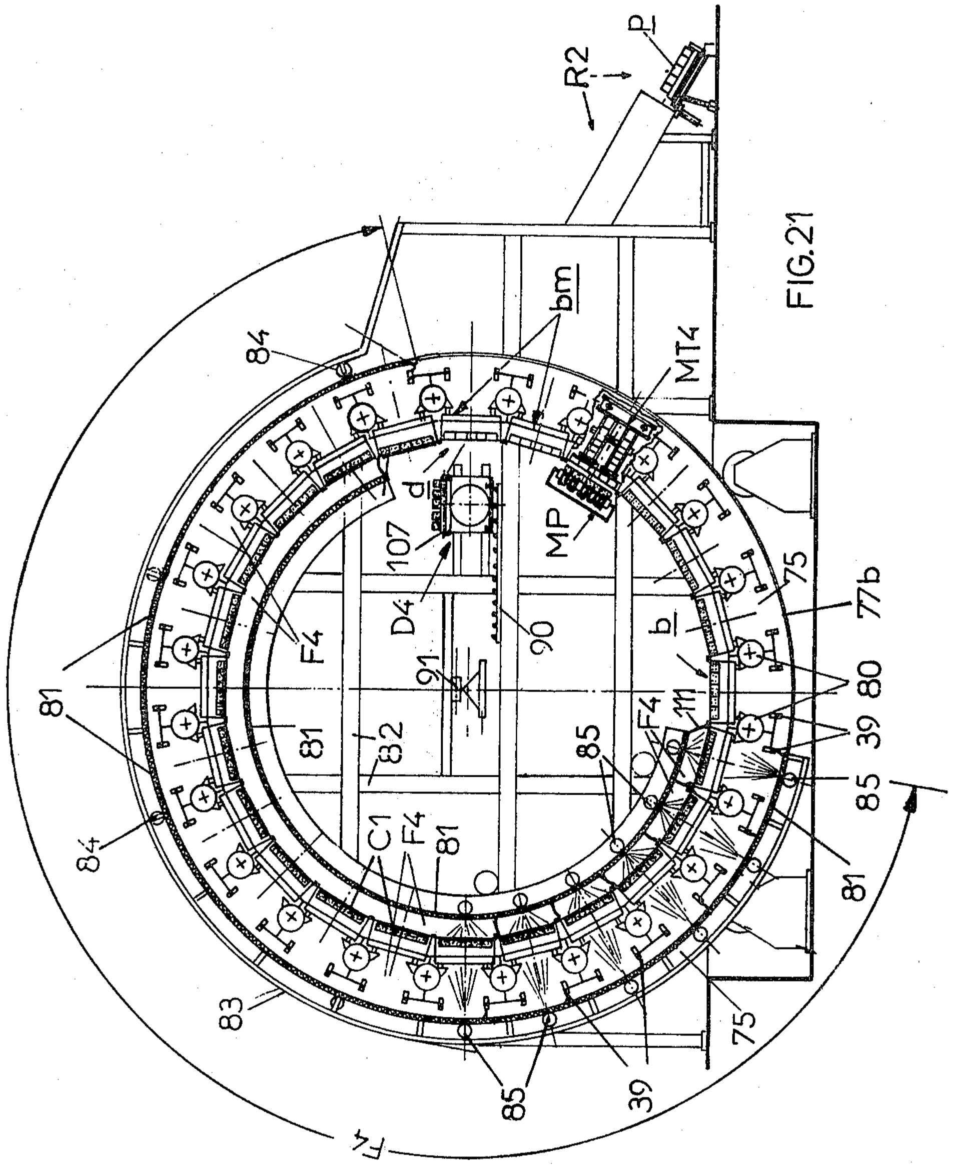
FIG. 21 is a cross-section of a "rotary hall", provided on the one hand with said self-supporting structure (FIG. 20) and on the other hand with a shock heat treatment installation, with a multipurpose stripping installation and with a cooling installation arranged to slope outwardly.
Figure 22:
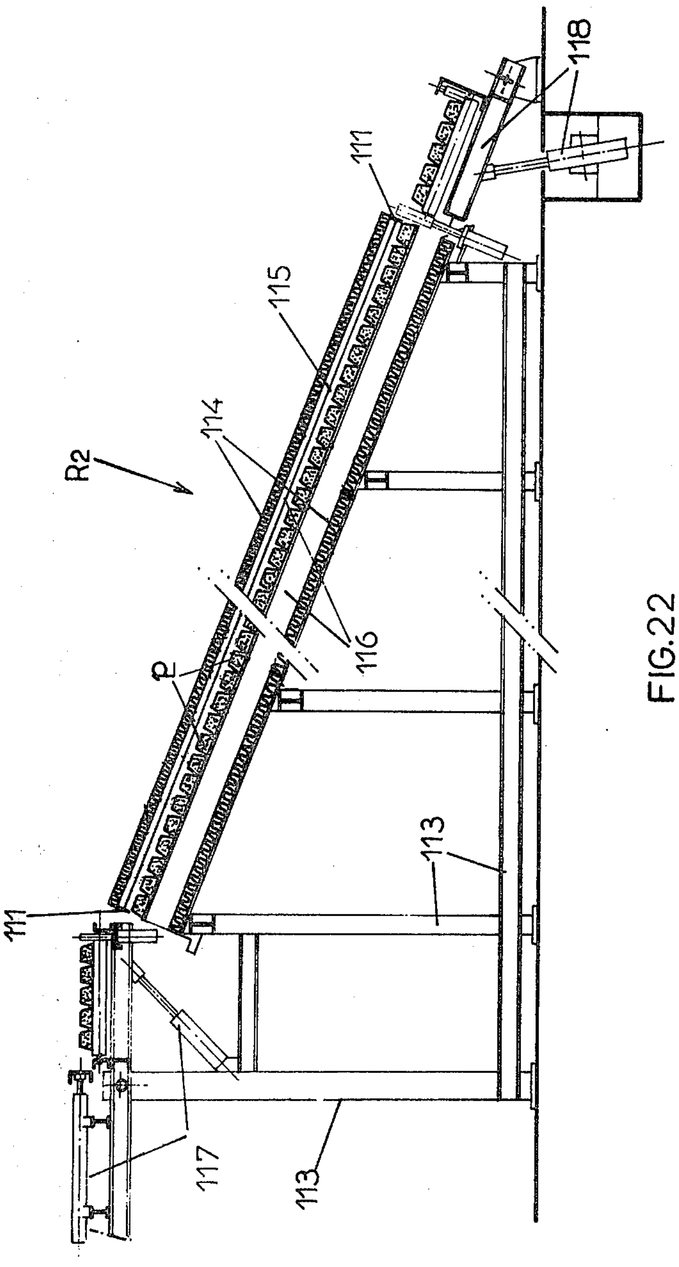
FIG. 22 is a cross-section of the cooling installation arranged on a slope outside the "rotary hall" (FIG. 21).
Figure 23:
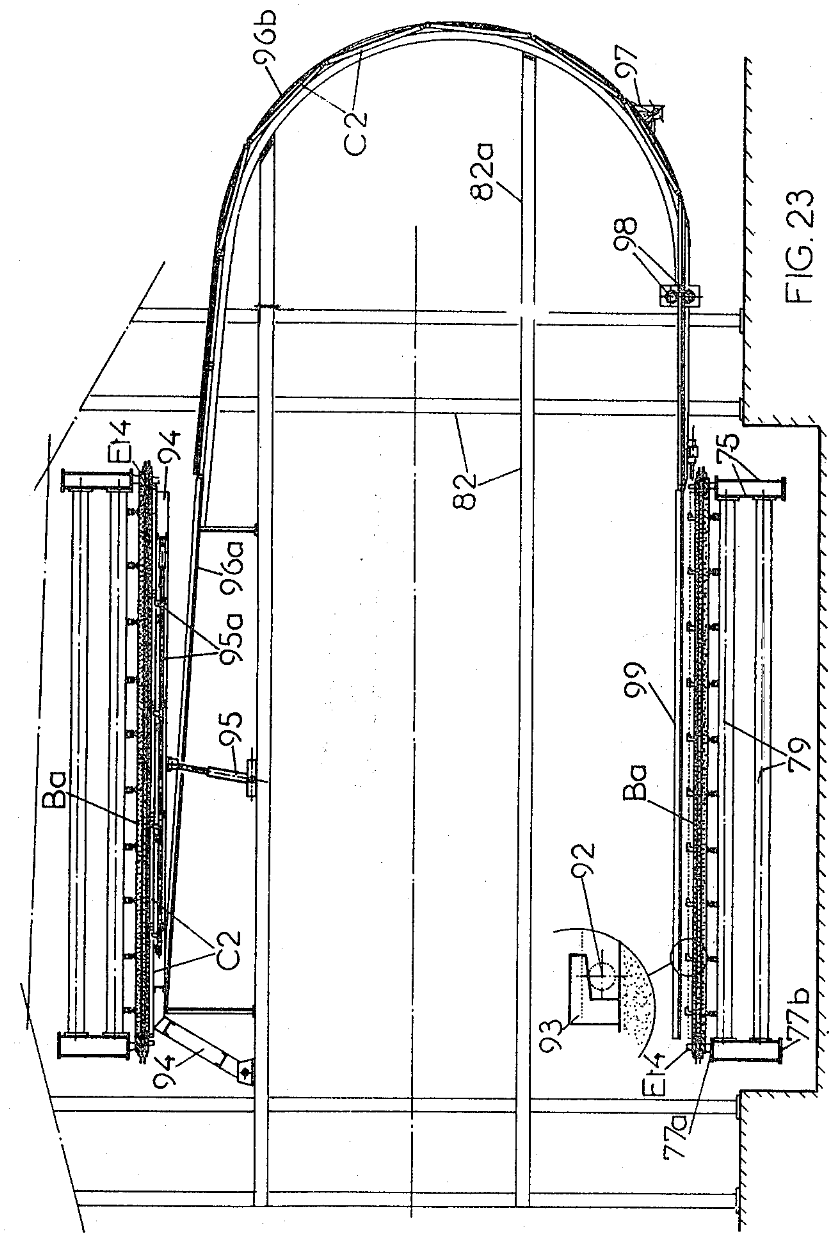
FIG. 23 is a longitudinal section of a "rotary hall" provided on the one hand with a structure equipped itself with self-supporting screens for tensioning wire by wire and on the other hand with an installation for the transfer by gravity of the covers and with a cooling installation on a slope arranged inside the hall.
Figure 24:
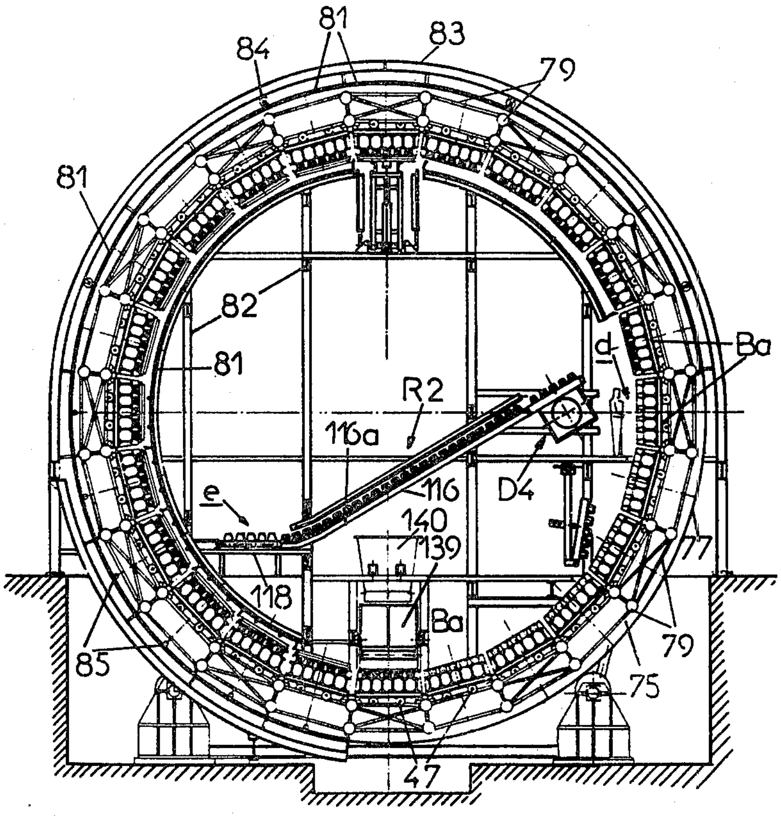
FIG. 24 is a cross-section of the "rotary hall" (FIG. 23).
Figure 25:
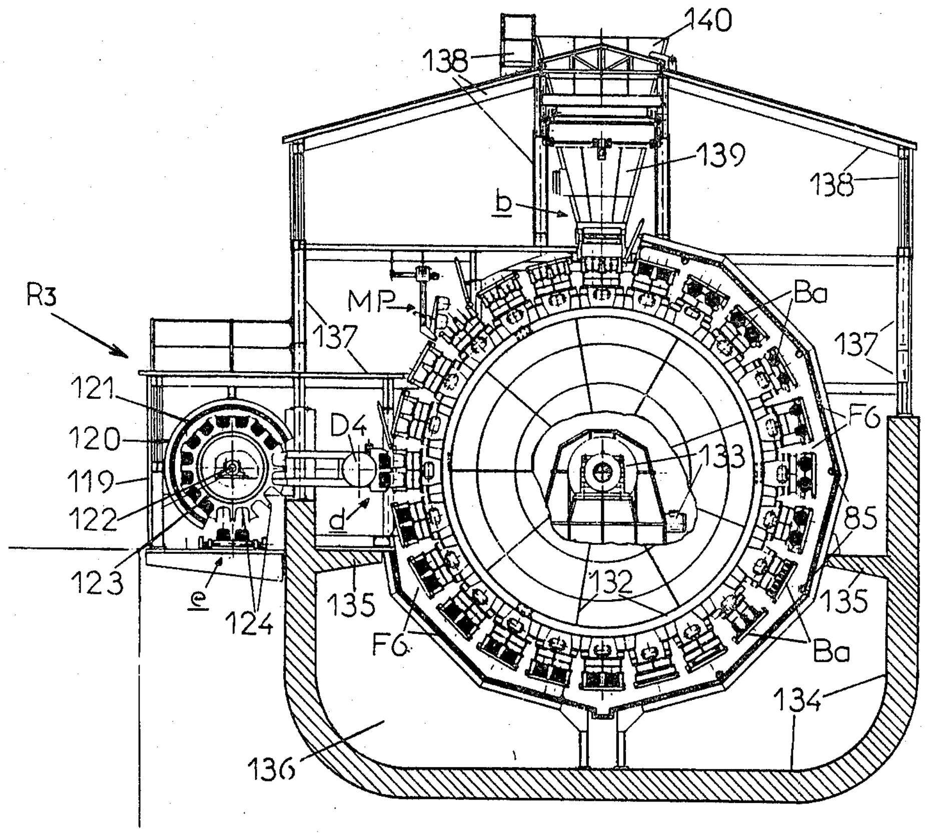
FIG. 25 is a cross-section of a "rotary drum" equipped with self-supporting mold beds, according to one of the solutions described above, and provided with a group positioning device, with a shock heat treatment installation with tilting covers, with a multipurpose installation and with a rotary cooling installation.
Figure 26:
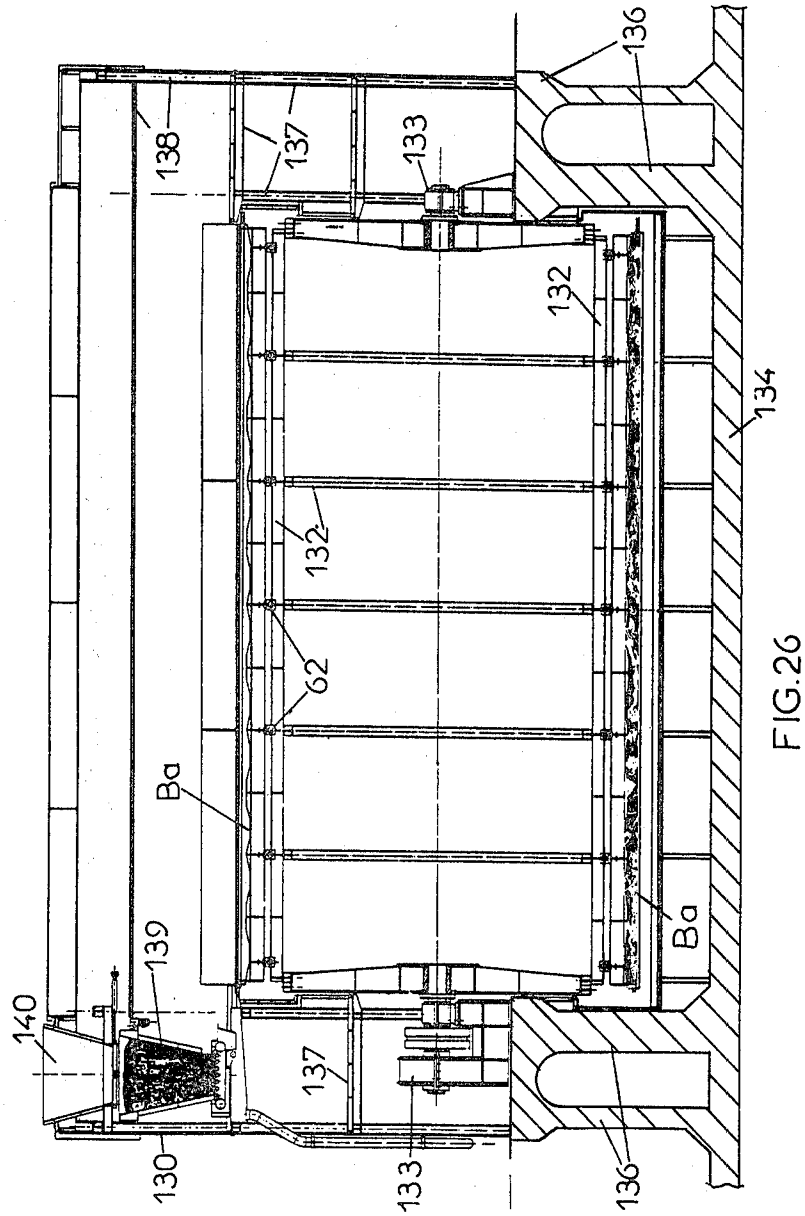
FIG. 26 is a longitudinal section through the "rotary drum" (FIG. 25).

The group positioning devices MP, (FIGS. 5, 19 and 25), include two or several arms 12, of which one is fixed 12*a*, and at least one supporting sliding arm 12*b*, which arms are provided with tilting heads 13 and, for the arms 12*b*, with means 14, for rolling along the molds so that, in the "arms closed" position (at one of the two ends of the molds), the screens are fixed by known means to said heads and the reinforcements are threaded through said screens, locking them on the fixed screens on the supporting arms and so that, in the "arms separated" position, the "screens reinforcements" unit is tilted in the molds.

The devices for group tensioning by biassed sliding MT1, (FIGS. 6 and 7), comprise some sliding shafts 15 inside sleeves 15*a*, fixed on the bias to the two ends of the self-supporting beds of the self-supporting structures, by means of gussets 16, which shafts are provided on the one hand with some sleeves 17, ensuring the adjustable fixing of the means 18, for hooking engagement of the head screens, and on the other hand with means 19, ensuring the to and fro movement, so that, by sliding with separation with respect to the molds, the group tensioning of the reinforcing rods is effected and so that, by sliding in reverse direction with their bringing together, on the one hand the slow slackening of the reinforcements is ensured with the taking up of the prestressing forces by the self-supporting screens which thus remained flattened on the ends of the stripped products and on the other hand the stripping of said products is facilitated.

The devices for group tensioning by a deformable parallelogram MT2 (FIG. 13), include a series of link rods 20, provided with hooking engagement means 21, head screens, connected by ordinary hinges 22, to a series of link rods 20*a*, for fastening by articulation at the ends of the structure for taking up the tensioning forces, and an the other hand with locking means 23, so that the assembly described works like a deformable parallelogram which, in stretched position, is self-locking and which, by unlocking ensures the slow loosening of the reinforcing rods, facilitates the stripping and releases the head screens which remain thus flattened at the ends of the stripped products.

The devices for tensioning by sliding in parallel MT3, (FIG. 15), comprise some sliding beams 24, of high strength, provided with hooking engagement means 25, and locking means 26, for the head screens, and with some parts 27, for sliding, which beams are connected through one or several rods 28, provided particularly with screwing means 29, to arms 30, fixed to the two ends of the beds or of the self-supporting structures, by dismountable means 31, so that, by the operation of screwing the rods, the group tensioning is effected and so that, by unscrewing, the taking up of the prestressing forces by said self-supporting screens is effected which rest thus flattened at the ends of the stripped products.

The devices for group tensioning by tilting MT4, (FIGS. 20, 21, 27 and 28), comprise some arms 32, mounted by means of axles 33, and two gussets 34, to the two ends of the self-supporting beds or self-supporting structures, which arms are equipped with some beams 35, provided with means 36, for fastening to said arms, with means 37, for hooking engagement of the top screens and with means 38, for locking said screens so that, by the tightening of the arms by means particularly of some tie-rods 39, provided with means 40, for screwing and with means 41, for protection, the slow and group tensioning of the reinforcements is effected and so that, by loosening the tensioning forces are transformed into prestressing forces taken up by the same screws which thus remain flattened at the ends of the stripped products.

In certain cases, it is possible to mount the tilting arms 32, on structures for taking up the tensioning forces, through some devices 42, enabling the bias sliding so as to facilitate the stacked stripping of the products.

The self-supporting beds Ba1, (FIGS. 6, 7 and 8), designed for the manufacture of products with group tensioning, include on the one hand a framework for taking up the tensioning forces constituted particularly by means of two principal strengthening beams 43, provided in certain cases with rails 44, for the distribution of the concrete, and by means of a series of cross beams 45, provided either with plates 46, for fastening vibrators 47, or with parts 38, facilitating the hooking engagement of the removable contacting means, and on the other hand one or several batteries of ordinary molds bm, mounted head to head by welding, either dismountably, so that said beds equipped with group tensioning devices, with movable and self-supporting screens and, in certain cases, with means adapted for rolling 49 may be used with increased efficiency in the "on the ground", "in chain" and "rotary" methods.

The self-supporting beds Ba2, (FIGS. 17, 18, 19, 25 and 26), designed particularly for the manufacture of linear products with wire by wire tensioning, include on the one hand a series of longerons for the taking up the tensioning forces, constituted by means of some longitudinal beams 50, on which are welded in pairs the side walls of the molds 51, connected in advance by a metal profile 52, which longerons are reinforced transversely by the bottom of the molds 51*a*, and by some beams 53, serving at the same time for the fastening of compacting means, and provided with sliding parts on a slope 54, so that by equipping said self-supporting banks of screens, particularly of the type Et3 or Et4, and in certain cases with means adapted for rolling 49, they can be used with increased efficiency "on the ground" "in chain formation" or by "rotation".

The self-supporting beds Ba3, (FIGS. 9 and 10), designed for the manufacture of surface products (slabs, floorings etc . . . ), include a framework 55, for taking up the tensioning forces covered with a smooth sheet metal 55*a*, or equipped in certain cases with means adapted for rolling 49, which framework is provided with a series of recesses 56, having front walls 56*a*, on a slope so as to be able to receive the head screens Et4, in a position fixed to one of the ends and in a variable position, according to the length of the product, at the other end.

The movable and self-supporting screens, the positioning devices and the group tensioning devices and the self-supporting beds enable, according to the method described, production of novel mold-bearing structures and of novel installations for the shock heat processing, stripping and cooling which improve the efficiency of the known methods for the manufacture of products of concrete prestressed by bonded armatures.

Thus the self-supporting beds, equipped with self-supporting screens and, in certain cases, with group tensioning devices, may be, particularly for small production units, fixed "to the ground" either head to head or side to side.

The beds may be moved "chainwise" either head to head particularly on rollers, or side to side by means adapted for rolling, or finally by rotation on a vertical axis or horizontal axis.

Figure 8:
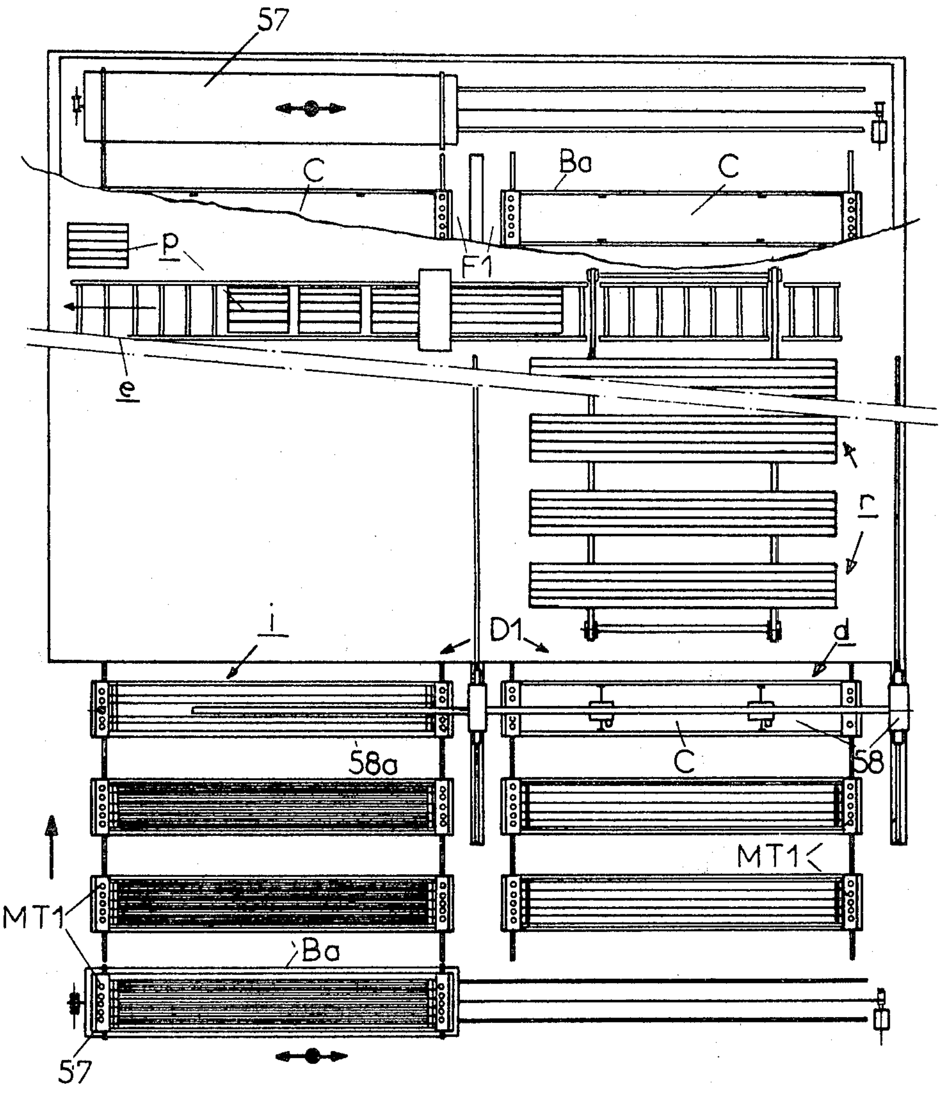
FIG. 8 is a plan view of a chain equipped with beds of self-supporting molds and with a shock heat treatment installation.
Figure 9:
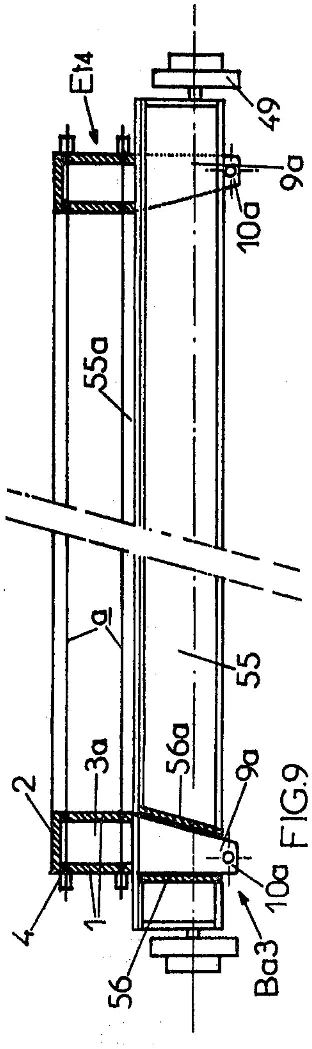
FIG. 9 is a longitudinal section through a self-supporting bed for the manufacture of honeycomb slabs, provided with self-supporting screens for tensioning wire by wire.

In FIG. 8, is shown a chain equipped with bed of self-supporting molds provided with means adapted for rolling, which beds move on rails in a manufacturing circuit, in a horizontal plane, closed by means of two transtripping means 57, so as to pass the molds filled with concrete and closed by means of covers C, through two adjacent chambers F1, for intensive heating in a tunnel and to present them to the stripping station d, above an installation D1, constituted either by a travelling crane, or particularly by a gantry 58, provided with an overhanging beam 58*a*, and with lifting and engagement means, which effect on the one hand the transfer of the covers between the stripping station d and the station for introduction into the tunnel i, and on the other hand the transfer of the stripped products to said tunnel where the cooling r, the finishing and removal are successively carried out.

Figure 10:
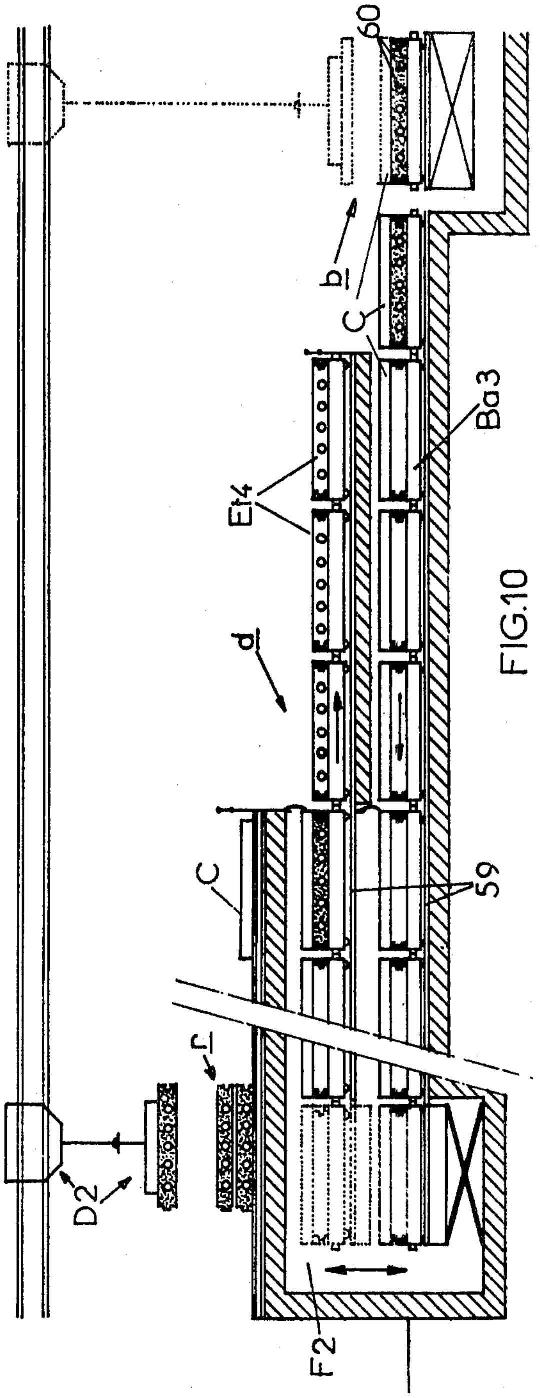
FIG. 10 is a section through a manufacturing circuit of the "multipurpose chain" type equipped with self-supporting beds according to FIG. 9.

In FIG. 10, is shown the manufacturing circuit of the "multipurpose chain" type with two tracks 59, superposed in a vertical plane, which circuit is equipped with self-supporting beds of molds, particularly of the Ba3 type, and provided on the one hand with a shock heat treatment installation including covers C for closing the molds and an intensive heating chamber-tunnel F2, and on the other hand with means D2, for transferring said covers between the stripping station d and the concreting station b, for stripping and for transfer of the stripped products p above said chamber F2, for cooling, so that in providing the concreting station with a device for the introduction of the tubes 60, through the screens Et4, it is possible to produce the compacting of the concrete in two stages, of which the last is effected "closed-bed", which operation permits the extraction of said tubes, by traction combined with some movements of rotation in two directions, without danger of collapse of the concrete during the extraction of the tubes or afterwards.

Figure 11:
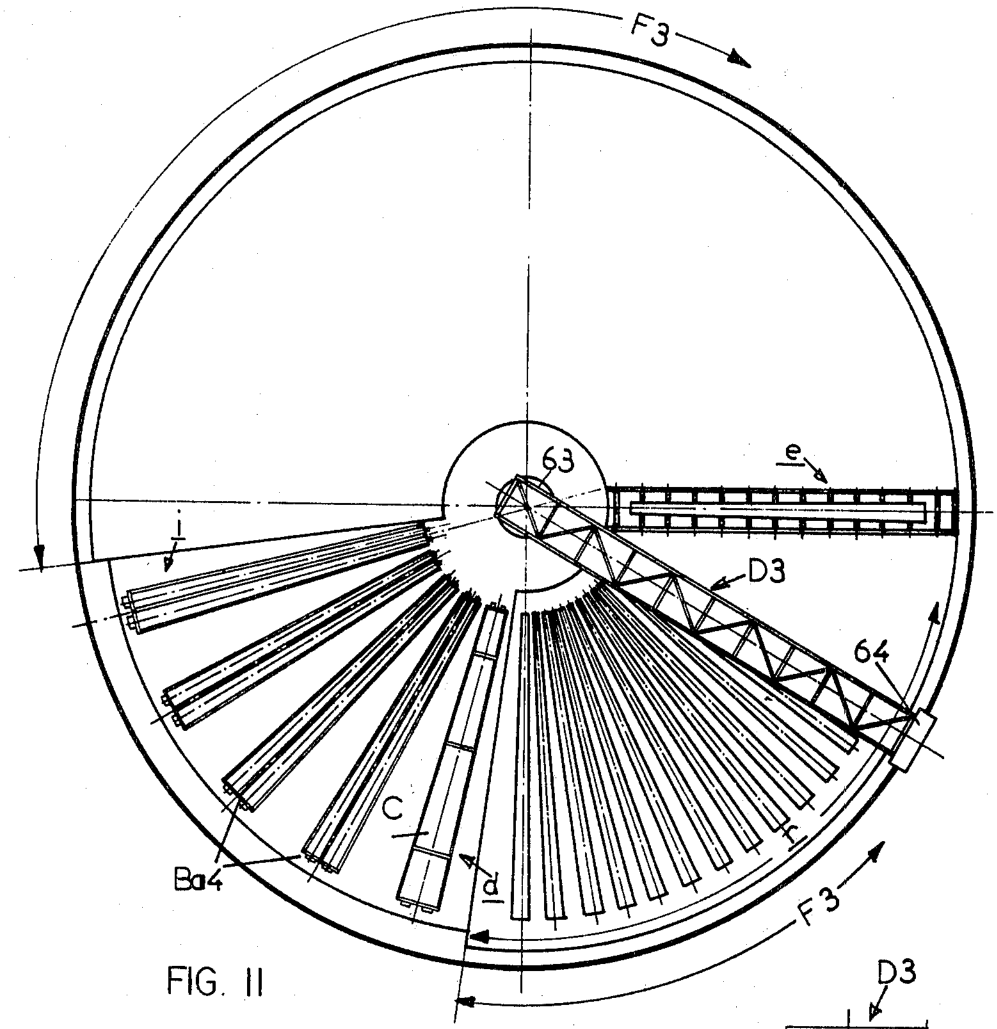
FIG. 11 is a longitudinal section through a self-supporting bed of molds, designed for the manufacture of posts for electric power lines, which bed is provided with self-supporting screens for group tensioning and mounted on a chain with a vertical axis.
Figure 12:
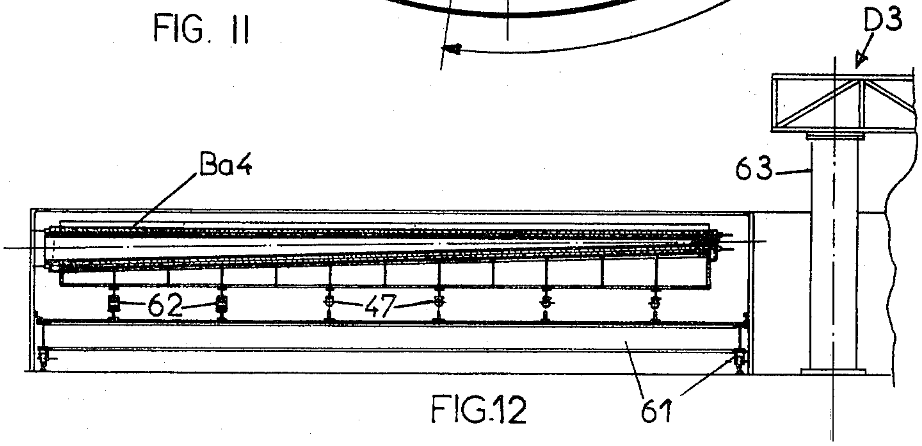
FIG. 12 is a plan view of a rotary chain, with a vertical axis, equipped with self-supporting beds of molds, according to FIG. 11, and provided with a shock heat treatment installation.

In FIGS. 11 and 12, a rotary production chain with a vertical axis is shown, equipped on the one hand with self-supporting beds Ba4, particularly for the manufacture of posts for electrical supply lines, and provided on the other hand with a rotary table 61, which passes, through its step by step rotation, said beds fixed on elastic studs 62, and closed by means of covers C, through a circular chamber F3 for intensive heating and presents them at the exit from the latter at the stripping station d, beneath an installation D3, which by means of a rotary gantry with a central pivot 63, and with an external foot 63*a*, rolling over a circular rail 64, effects on the one hand the transfer between the stations d and i, and on the other hand the stripping and transfer of the stripped product between said stripping station and the cooling station r, and between the latter and the removal station e.

Figure 13:
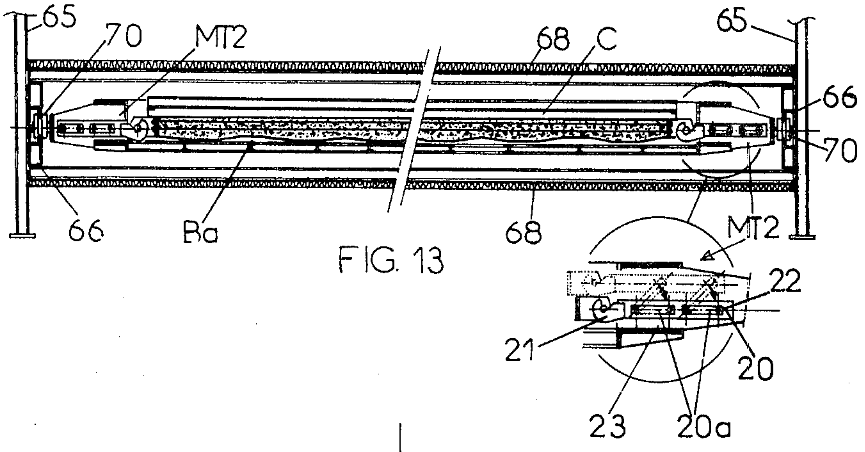
FIG. 13 is a longitudinal section through a self-supporting bed molds, provided with self-supporting screens and with devices for group tensioning by deformable parallelogram, which bed is provided with its own roller means and mounted on a structure enabling movement in a circuit of the "rotary hall" type.
Figure 14:
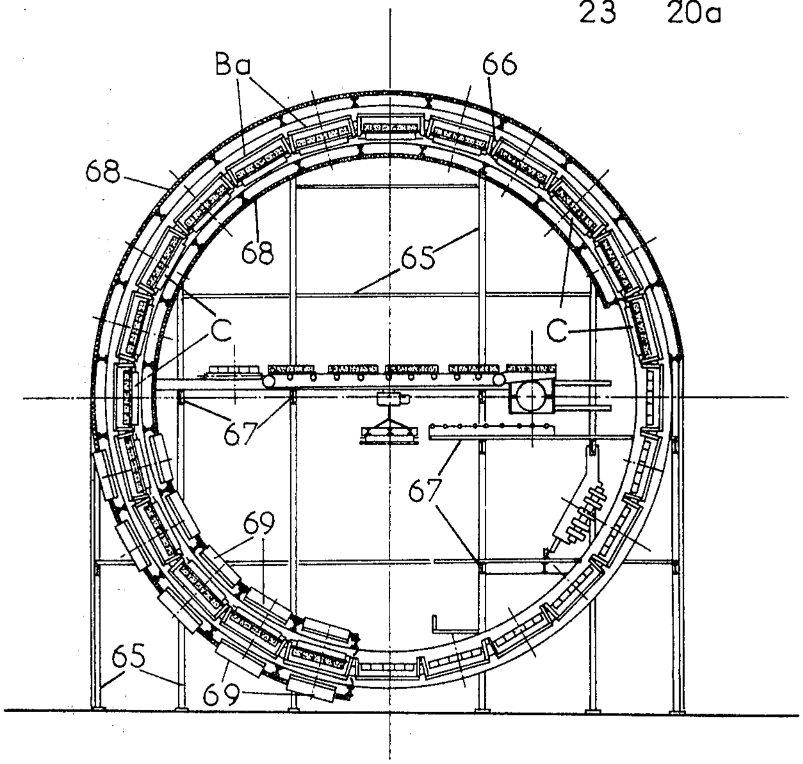
FIG. 14 is a cross-section of a rotary chain with a horizontal axis, equipped with self-supporting beds of molds and provided with installations of the type used in the "rotary hall" process.
Figure 15:
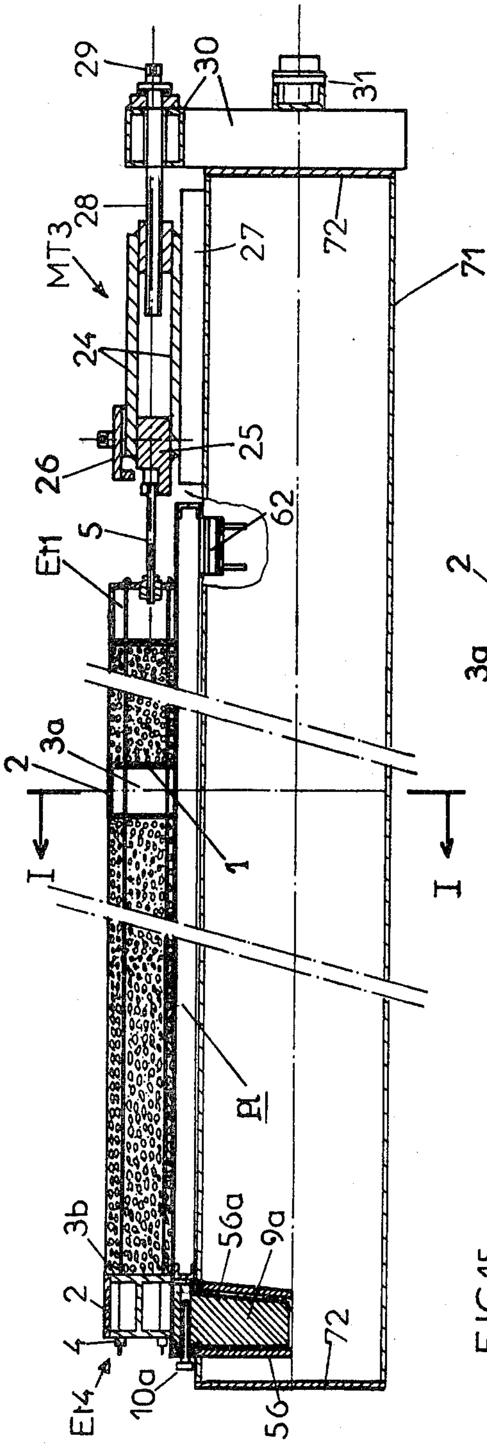
FIG. 15 is a longitudinal section through a floating self-supporting structure, provided with group tensioning devices, particularly by sliding in parallel, and with a smooth platform mounted on elastic studs and equipped with self-supporting screens.
Figure 16:
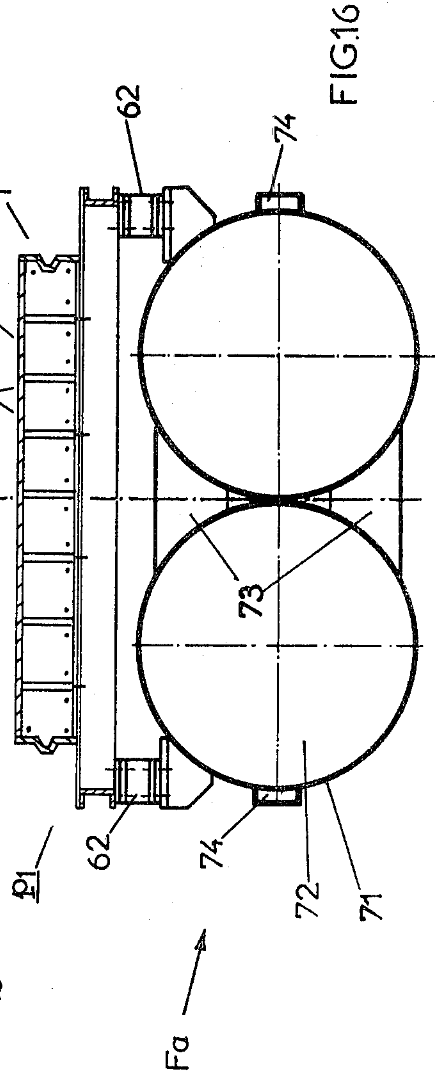
FIG. 16 is a cross-section along the line I—I or FIG. 15 through said floating structure.

In FIGS. 13 and 14, is shown a rotary production chain with a horizontal axis, provided with a fixed structure having two top gantries 65, equipped with some circular guides 66, and connected on the one hand by working platforms 67, and on the other hand by the walls 68, of the heating chamber F4, provided with heating means, particularly by infrared radiant heaters 69 (electrical or gas) so that the beds of molds Ba, equipped with means adapted for rolling 70, enclosed by means of covers C, are moved in a rotary circuit, which circuit can be provided with stripping and cooling installations of the types described below for the "rotary hall" method.

For the "float chain" method, it is possible to design floating structures self-supporting with respect to the tensioning forces, constituted by means particularly of floating and strengthening to 72, stiffened by top walls 72, and by various gussets 73, and provided with a buffer 74, so that in equipping said group tensioning device structures or self-supporting screens Et4, and with a smooth platform p1, fixed to elastic studs 62, and equipped in its turn with self-supporting screens, they can be carried, according to said method, to a manufacturing circuit by floating or by floating and immersion, particularly for the manufacture of products having a considerable width and/or length.

Another preferred embodiment is that of "rotary hall", improved as regards the installations for the treatment, stripping and cooling (FIGS. 19, 20, 21, 22, 23 and 24).

Thus, by using two rings constituted as a caisson of high inertia, by means of two walls 75, of thick sheet metal, reinforced by radial gussets 76*a*, and/or circular gussets 76*b*, and by means of an inner sole 77*a*, and an outer sole 77*b*, the latter being providable either with a roller band 78, or serves itself as a roller band and, by placing said rings at the two ends of the structure, the latter can be produced in two modifications (FIG. 19), of which one non-supporting having said rings connected by a braced metal framework 79, provided with elastic studs 62, and equipped with self-supporting beds Ba, and the other self-supporting with respect to the tensioning forces (FIG. 21), having the rings connected by a framework 80, of high strength, capable of taking up the tensioning and supporting forces, through elastic studs, the mold batteries bm, which structure is equipped either with group tensioning devices, notably of the MT4 type, or with self-supporting screens of the Et4 type, so that the two types of structures described enable filtration of vibrations of smaller amplitudes at the stations which follow the concreting, with beneficial effects for the rapid hardening and final strength of the concrete.

The arrangement of the two rings at the ends of the supporting structure enables a shock heat installation to be produced using a series of metal covers C1, movable with respect to the beds, the chamber F4, for intensive heating, arranged in a circular arc between the concreting station b and the stripping station d (the latter, placed at 270 with respect to the first), which chamber is provided on the one hand with heat treatment walls 81, placed to facilitate sealing between the two rings, which wall having the upper part suspended from the roofing 83, which, itself, is positioned by means of rollers 84, on the two rings, which chamber is equipped on the other hand with intensive heating means either by steam 85 or by means of electrical or gas infrared radiant heaters.

The metal covers C1, (FIGS. 14, 17, 18, 19 and 21), closing with a single part each mold bed between the concreting station and that of stripping, are constituted on the one hand by a strengthening framework 86, covered with a smooth sheet metal 87, and are provided on the other hand with automatic hooking-unhooking means 88, on said beds through some locking parts 89, so that the transfer of said covers, between the stripping station d and the concreting station b, is effected by means on the other hand of a short chain 90, and a rolling beam 91, which disengages said chain and lowers the covers into the vertical axis of the hall by hooking them onto the bed occuring at the concreting station.

In certain cases, the mold banks are closed by means of several covers C2, (FIGS. 23 and 24), constituted by a smaller framework 86*a,* itself also covered by a smooth metal sheet 87, and provided with some rollers 92, so that by fixing on the beds some parts 93, with the top sloped, it is possible to effect the locking of said covers on the filled bed at the concreting station by pushing them against one another, and so that the unlocking and the return of the covers is effected automatically by means of an installation, placed particularly in the vertical plane of the hall, including the tilting device 94, equipped with a jack 95 coupled to a rod with vertical fingers 95*a,* which on each stop of the hall, unlocks said covers and deposits them through its tilting onto two guide rails 96, mounted on a slope 96*a,* at the unlocking station and looped 96*b* between the latter and the concreting station, which loop is fixed by some reinforcements 82*a,* and provided with oiling means 97, and braking means 98, so that once said loop is filled with covers, the latter drop simply by gravity, arriving either directly in a positioning device 99, above the filled bed, or in certain cases at the end of said bed whence they are taken up again for the positioning by means of ordinary handling means.

The multipurpose stripping installation D4 (FIGS. 14, 19, 21, 24, 25 and 29), includes on the one hand a framework, particularly tubular 100, provided with two top walls 101, with means 102, for to and fro movement with respect to the mold bed which is at the stripping station and with means for rotation 103, it includes on the other hand means 104, for unlocking and 105, for positioning covers C, on the return chain 90, means 106, for stripping in stacks and means 107, for transferring these stripped products, provided or not with self-supporting screens in front of the intake of the various cooling installations and, in certain cases, it also includes cleaning and oiling means for the molds.

The cooling installations R, used especially for the "rotary hall" and for the "rotary drum", are designed on the horizontal R1, on a slope R2, or by rotation R3.

The installation R1 (FIGS. 14 and 19), arranged on the horizontal between the stripping station d and that of removal d, includes on the one hand a support floor 108, and an enclosure provided with a ceiling 109, with two top walls 110, and some closing diaphragms 111, and includes on the other hand step by step transfer means for the stripped products, particularly by means of chains 112.

The installation R2, (FIGS. 21, 22, and 23), arranged on a slope inside or outside the "rotary hall" comprises on the one hand a support framework 113, two principal heat insulating walls 114, two top walls 115, closing the diaphragm 111, and some slide beams 116, and includes on the other hand a device 117, for the introduction and pushing of the hardened products by and a device 118 for receiving below and transferring said products to the finishing chain.

The installation R3 (FIG. 25), includes on the one hand an independent support-framework 119, provided with a chamber 120, especially circular, with heat insulating walls 121, within which rotates, by means of a device 122, for stepwise rotation, a cylinder 123, provided with some dismountable recesses 124, having the contour of the stripped products, which products are thus transferred between the stripping installation D and the removal chain e, with gradual cooling.

For the "rotary drum" process, the method according to the invention enables on the one hand either the equipment of the ordinary rotary structure with self-supporting mold beds, or the formation of another structure, itself self-supporting with respect to the tensioning forces, and on the other hand providing said method with novel installations so as to be able to produce units fixed or movable by terrestrial or maritime routes, improving the manufacture of the prestressed concrete products.

Figure 27:
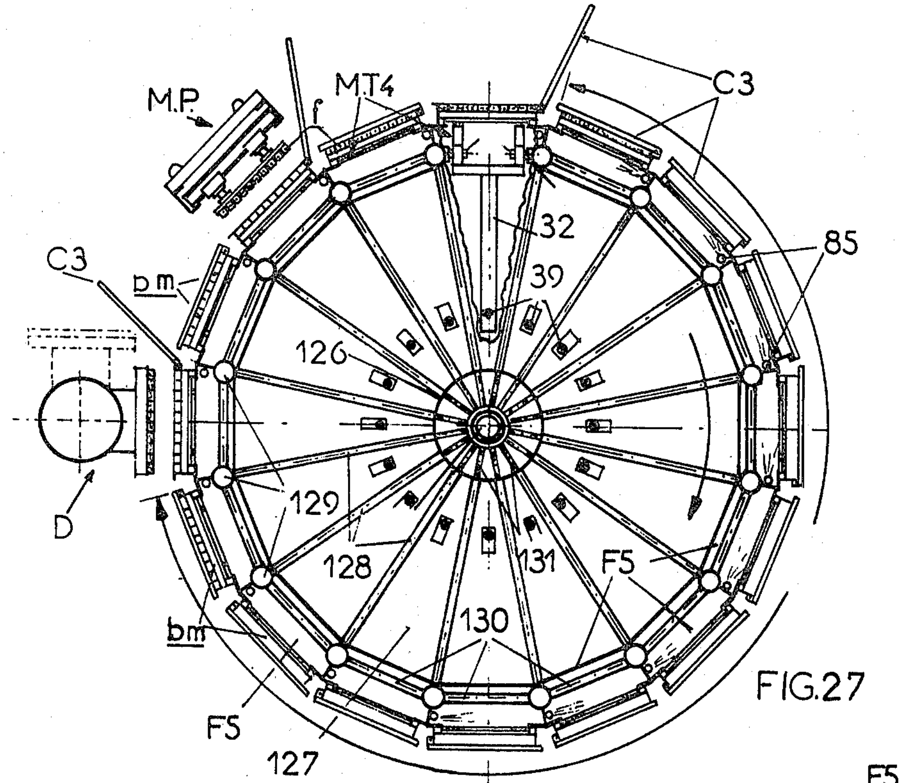
FIG. 27 is a cross-section of a structure of the "rotary drum" type, self-supporting with respect to the tensioning forces, which structure is provided principally with group tensioning devices by tilting and with an incorporated shock heat treatment installation.
Figure 28:
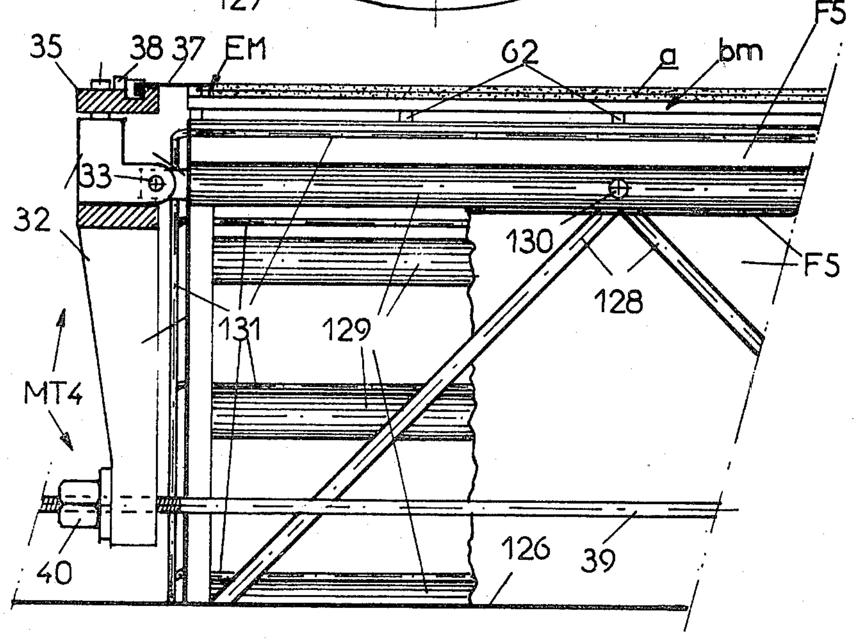
FIG. 28 is a longitudinal section through the above structure (FIG. 24).
Figure 29:
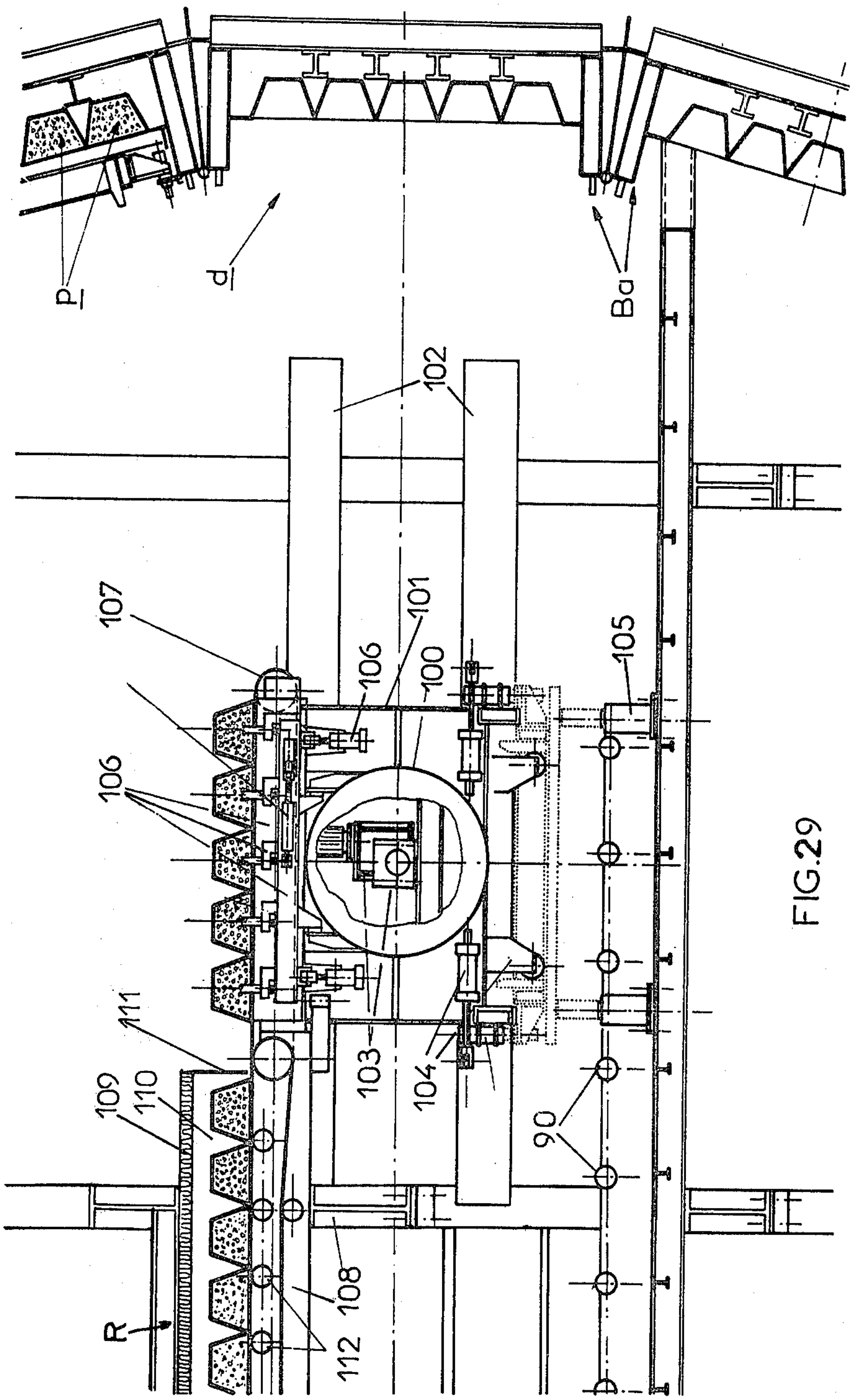
FIG. 29 is a cross-section through the multipurpose stripping installation.

In FIGS. 27 and 28, is shown the self-supporting rotary structure, constituted by an axial beam 126, for support and rotation, connected through two top walls 127, and by some radial bracing elements 128, to a series of peripheral beams 129, for taking up the tensioning forces, which beams brace also in the circular direction by means of elements 130, and equipped on the other hand either with self-supporting screens Et4, or with group tensioning devices MT4, and with ordinary mold batteries bm, provided with self-supporting screens Et, and provided on the other hand with a shock heat treatment installation including tilting covers C3, fixed to the structure or to the batteries, a series of intensive heating chambers F5, recessed inside said structure, and a rotary deivce 131, for supplying steam, so that said structure represents the governing part of a fixed, movable or floating plant for the manufacture of prestressed concrete products.

A last example of an embodiment is that of a floating factory of the "rotary drum" type, (FIGS. 25 and 26), including either a self-supporting structure equipped with batteries of ordinary molds, provided with tilting covers C3, for closing, or a non-supporting structure 123, equipped with self-supporting beds provided, themselves also, with tilting closing covers, which structures are mounted by means of two support and rotating devices 133, in a shell 134, especially of reinforced concrete, which shell is provided on the one hand with some assembly consoles 135, and with two walls 136, supporting said structures and for transverse reinforcement, which shell is provided on the other hand with a metal framework having the lower portion 137, firmly fixed to its walls and the upper portion 138, dismountable or even sliding in the lower part, in order to reduce the height during transportation so that by equipping on the one hand said factory with a group positioning device MP, with a concreting installation with a fixed hopper-buffer 189, and with a movable distributing hopper 140, with a chamber F6, with intensive heating and with a rotary cooling installation R3, it also, dismountable for transportation, and by providing on the other hand said factory with a series of annexes, particularly a steam boiler, an electrical power plant, a maintenance workshop, a laboratory, shops, office, sanitary facilities, etc . . . , an autonomous floating unit is obtained of very high yield which permits reduction at the same time of the distance of transportation both for the raw materials (sand and granulates on site) and for the finished products.

I claim:

1. A method of manufacturing concrete products prestressed by bonded reinforcements, comprising the steps of:

using movable and self-supporting screens for closing molds at both ends and anchoring reinforcements such as wires and strands;

after tensioning the reinforcements, and molding concrete in molds, and after hardening of concrete, particularly by passing filled molds through a heat treatment installation, stripping the products with transfer of the prestressing forces to the end screens;

then, passing the stripped products through a cooling installation;

and, after the passage of said products through the cooling installation, the concrete having acquired additional strength with respect to that which it had on stripping, effecting the transfer of the prestressing forces to the concrete by bonding, and then recovering the self-supporting screens.

2. A plant for working a method according to claim 1 comprising molds which are closable at their both ends; self-supporting movable screens for closing the molds at their both ends and for anchoring the reinforcements; means for tensioning the reinforcements, which means are hookable to said movable screens; means for stripping the products in a stack after hardening of concrete with transfer of the prestressing forces to the end screens; guiding means for passing the stripped products through a cooling installation; and means for effecting, in a further stage, the transfer of the prestressing forces to the concrete by bonding and for recovering the self-supporting end-screens.

3. A plant according to claim 2 in which the self-supporting screens for closing the ends of the molds and for anchoring reinforcements comprise, on the one hand, two front walls, according to the profile of the product to be manufactured and mounted with respect to one another at a distance enabling cutting of reinforcements, which walls are provided with holes for the passage of said reinforcements and with covers, said walls being reinforced by means of ribs in order to make them self-supporting especially with respect to the prestressing forces, said screens comprising, on the other hand, anchoring means for the reinforcements and means for rapid hooking to a group tensioning device.

4. A plant according to claim 2 in which the self-supporting screens are constituted by a single part, particularly a cast part, according to the profile of the product to be manufactured, said part being provided with anchoring means and hooking means.

5. A plant according to claim 2 in which the self-supporting screens comprise a strengthening plate which is provided on the one hand with anchoring means for the reinforcements and with a wall having a profile according to the product to be manufactured, which wall extends inside the molds over a length ensuring a rapid and sealed fixing, and, on the other hand, with means for sliding on a slope with respect to said ends.

6. A plant according to claim 4 or 5 in which said part or plate is provided with holes for cutting off the reinforcements.

7. A plant according to claim 2 in which the self-supporting screens comprise a self-supporting framework for anchoring reinforcements, said framework being provided with at least one foot for sliding on a slope, said foot being provided with locking means.

8. A plant according to claims 2 which comprises a reinforcement group positioning device having at least two arms of which one is fixed and one of which is slidable, which arms are provided with tilting heads and the slidable arm is provided with means for rolling along the molds.

9. A plant according to claim 2 which comprises a reinforcement group tensioning device with sliding spindles, inside sleeves fixed on a bias to the two ends of a self-supporting bed or a self-supporting structure, which spindles are provided on the one hand with sleeves ensuring an adjustable fixing of the head screens and, on the other hand, with guiding means ensuring a to and fro movement.

10. A plant according to claim 2 which comprises a reinforcement group tensioning device comprising link rods provided with hooking means for the screens, connected by hinges to other link rods for fixing by hinges at the ends of the structure for taking up the tensioning forces, said group tensioning device comprising moreover self-locking means so that the assembly works like a deformable parallelogram which, in its taut position, ensures the group tensioning and which, by unlocking, ensures the slow loosening of the reinforcements, facilitates stripping and frees the head screens which remain flat at the ends of the stripped products.

11. A plant according to claim 2 comprising a reinforcement group tensioning device having at least one sliding beam of high strength provided with hooking means and locking means of the screens, and with some parts for sliding, which beam is connected through at least one rod provided particularly with screwing means to arms fixed at both ends of a self-supporting bed or structure by dismountable means.

12. A plant according to claim 2 comprising a reinforcement group tensioning device having tilting arms mounted at both ends of a self-supporting structure, which arms are equipped with beams provided with means for fastening said arms, with means for hooking the screens and with means for locking said screens.

13. A plant according to claim 2 comprising a self-supporting bed comprising on the one hand a framework for taking up the tensioning forces and means for mounting vibrators or for the hooking of removable compacting means, and, on the other hand, at least one battery of ordinary molds, mounted head to head, said self-supporting bed being provided with rolling means.

14. A plant according to claim 13, in which the self-supporting bed is provided with rails for concrete distribution.

15. A plant according to claim 2 comprising a self-supporting bed, particularly for manufacturing products requiring wire-by-wire tensioning, which comprises, on the one hand, a series of longerons for taking up the tensioning forces, which longerons are reinforced transversely by the bottom of the molds and by some beams serving also for the fixing of compacting means, and, on the other hand, parts for sliding on a slope and adapted for cooperating with complementary bias surfaces provided on said self-supporting screens.

16. A plant according to claim 15 in which the longerons for taking up the tensioning forces are constituted by means of longitudinal beams, on which the lateral walls of the molds are fixed, particularly by welding, said lateral walls being connected firstly to an angle iron.

17. A plant according to claim 2 comprising a self-supporting bed, particularly for manufacturing surface products such as slabs, floors, panels and the like, which bed comprises a framework for taking up the tensioning forces, covered with a smooth metal sheet, this framework being provided with a series of recesses having sloping front walls in order to be able to receive screens having complementary sloping surfaces in a position, according to the length of the products, at the other end.

18. A plant according to claim 17 in which the framework is provided with rolling means.

19. A plant according to claim 2 comprising, on the one hand, a frame work, particularly tubular, provided with means for to and fro movement with respect to a mold bed occurring at the stripping station and with rotational means and including, on the other hand, means for unlocking the covers and means for positioning said covers on a return chain, means for stripping the products in front of the entrance of a cooling installation.

20. A plant according to claim 2 comprising a rotary production chain for rotating the molds around a horizontal axis along a circular path through a plurality of working stations, especially a lower concreting station where covers are locked to the molds after filling of said molds with concrete, and an upper cover unlocking station, said plant being provided with an installation for automatically returning the covers of the molds, said installation including a tilting device which unlocks said covers and deposits them through its tilting onto sloping guide rails which form a loop between the upper unlocking station and the lower concreting station, said loop being filled with covers which drop by gravity.

21. A plant according to claim 2 comprising a rotary production chain with a rotary hall for rotating the molds around a horizontal axis along a circular path through various working stations, said plant comprising a cooling installation arranged on a slope inside the rotary hall.

22. A plant according to claim 2 comprising a rotary production chain with a rotary drum for rotating the molds around a horizontal axis along a circular path through various working stations, said plant comprising a cooling installation including a chamber with heat insulating walls within which a cylinder being provided with recesses in which the products are transferred, with gradual cooling, from a stripping installation to a removal chain.

* * * * *